United States Patent
Akiyama et al.

(10) Patent No.: US 7,047,117 B2
(45) Date of Patent: May 16, 2006

(54) INTEGRATED VEHICLE CONTROL SYSTEM

(75) Inventors: Susumu Akiyama, Kariya (JP); Tsutomu Tashiro, Nagoya (JP)

(73) Assignee: Denso Corporation, Kariya (JP)

( * ) Notice: Subject to any disclaimer, the term of this patent is extended or adjusted under 35 U.S.C. 154(b) by 136 days.

(21) Appl. No.: 10/686,614

(22) Filed: Oct. 17, 2003

(65) Prior Publication Data

US 2004/0083043 A1   Apr. 29, 2004

(30) Foreign Application Priority Data

Oct. 18, 2002   (JP) ............................ 2002-304572

(51) Int. Cl.
*G06F 7/00* (2006.01)
*G06G 7/70* (2006.01)

(52) U.S. Cl. .................... 701/48; 701/33; 701/102; 701/115; 700/2; 700/20

(58) Field of Classification Search .................. 701/1, 701/29, 31, 33–34, 36, 48, 102, 114–115, 701/91; 700/2–3, 9, 11, 19–21; 714/1–4; 340/3.1, 3.2, 3.42, 3.43, 3.44
See application file for complete search history.

(56) References Cited

U.S. PATENT DOCUMENTS

| | | | | |
|---|---|---|---|---|
| 5,053,964 A | * | 10/1991 | Mister et al. | .................. 701/19 |
| 5,351,776 A | | 10/1994 | Keller et al. | .................. 701/70 |
| 6,052,632 A | * | 4/2000 | Iihoshi et al. | .................. 701/36 |
| 6,154,688 A | | 11/2000 | Dominke et al. | .............. 701/1 |
| 6,292,741 B1 | | 9/2001 | Bitzer et al. | ................. 701/115 |
| 6,484,082 B1 | * | 11/2002 | Millsap et al. | ................. 701/48 |
| 6,553,297 B1 | * | 4/2003 | Tashiro et al. | ................. 701/48 |
| 6,654,648 B1 | * | 11/2003 | Nada et al. | .................... 700/19 |
| 6,810,314 B1 | * | 10/2004 | Tashiro et al. | ................. 701/48 |
| 6,859,708 B1 | * | 2/2005 | Hashimoto et al. | .......... 701/48 |
| 6,892,126 B1 | * | 5/2005 | Tashiro et al. | ................. 701/54 |
| 2004/0064220 A1 | * | 4/2004 | Kobayashi | ..................... 701/1 |

FOREIGN PATENT DOCUMENTS

| | | |
|---|---|---|
| JP | 5-85228 | 4/1993 |
| JP | 10-250417 | 9/1998 |
| JP | 2000-71819 | 3/2000 |

* cited by examiner

*Primary Examiner*—Jacques H. Louis-Jacques
(74) *Attorney, Agent, or Firm*—Posz Law Group, PLC (57) ABSTRACT

An integrated vehicle control system includes various functionalized networks, such as power train group, vehicle motion group, and power source group, each including a plurality of ECUs connected via an individual communication line. A managing ECU in each network determines operation directives to be supplied to individual ECUs belonging to its own network based on information obtained from these individual ECUs as well as information obtained from other ECUs of different networks via a host communication line L4. The determined operation directives are transmitted to corresponding ECUs to cause respective individual ECUs to operate subordinately according to the given operation directives, thereby realizing a collective control of specific functions. The managing ECU also executes abnormality detection processing for detecting abnormality occurring in the integrated vehicle control system.

13 Claims, 7 Drawing Sheets

INTEGRATED VEHICLE CONTROL SYSTEM

BACKGROUND OF THE INVENTION

This invention relates to an integrated vehicle control system which allows each electronic control apparatus to transmit and receive various data to and from other electronic control apparatuses for controlling various functions of a vehicle.

In vehicles, especially in automotive vehicles, to satisfy recent market requirements including saving of fuel, improvement of safety, and improvement of convenience, many of the devices installed in an automotive vehicle are electronically controlled. To realize correlated operations and share mutual control information among electronic control apparatuses (hereinafter, referred to as ECU), respective ECUs are connected with each other via a common communication line so as to constitute a network (so-called LAN) to execute data communication.

Figure 7:
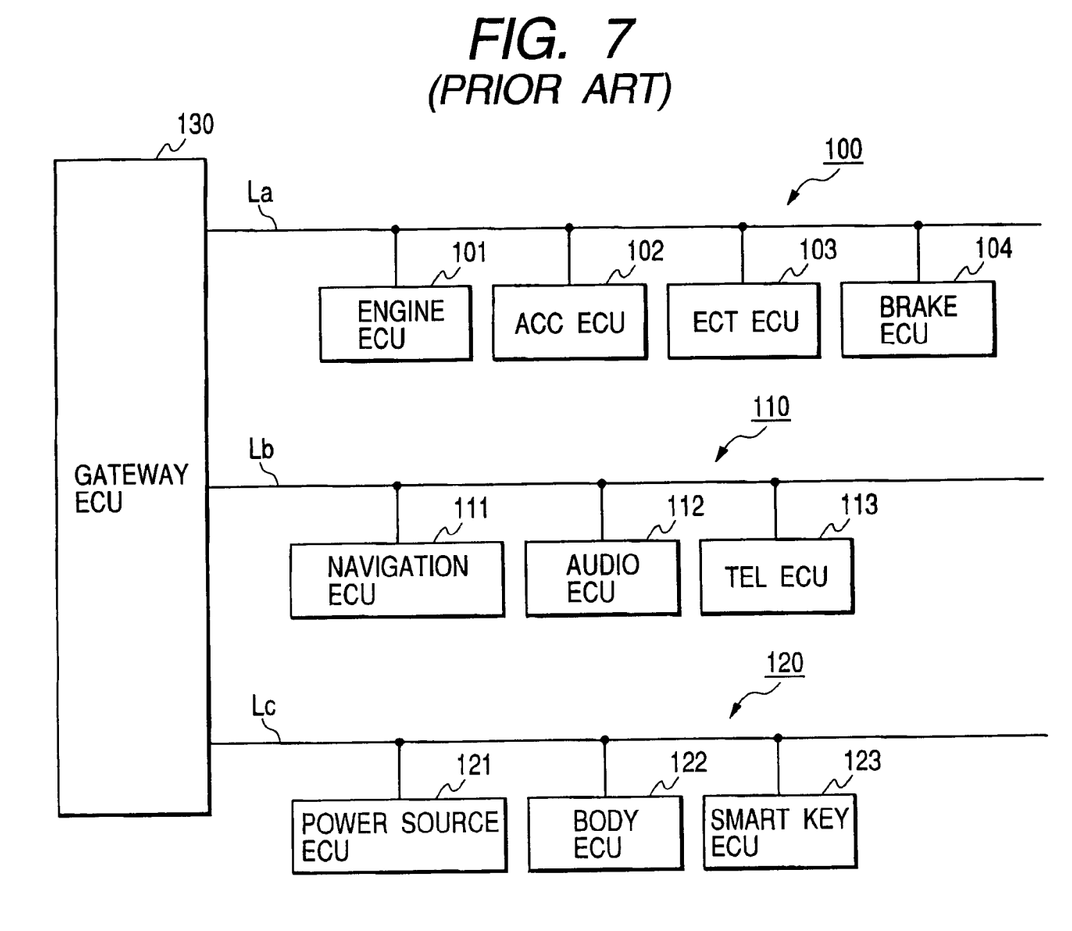
FIG. 7 is a block diagram showing the schematic arrangement of a conventional integrated vehicle control system.

For example, FIG. 7 shows an example of this kind of conventional network including a control device network 100, an information device (AVC device) network 110, and a body device network 120 which are distinctive network groups separated according to the classification of their fields.

The control device network 100, for various control devices installed in a vehicle, includes an engine ECU 101 controlling an engine, an ACC/ECU 102 executing a cruise control for adjusting a distance to a preceding vehicle traveling ahead of this vehicle or fixing a traveling speed of this vehicle to a constant value according to user's preference, an ECT(i.e., Electrically Controlled Transmission)/ECU 103 executing a gear shift control for an automatic transmission installed in the vehicle, and a brake ECU 104 controlling the braking device, which are connected to each other via a communication line La.

The AVC (i.e., Audio Video Control) device network 110, for various information devices installed in the vehicle, includes a navigation ECU 111 controlling a navigation device, an audio ECU 112 controlling an audio device, and a TEL/ECU 113 controlling a telephone device, which are connected to each other via a communication line Lb.

The body device network 120, for various body accessories installed in the vehicle, includes a power source ECU 121 administratively controlling the electric power of a vehicle battery, a body ECU 122 controlling lock/unlock of doors, and a smart key ECU 123 instructing lock/unlock of doors to the body ECU122 based on a transmitted waveform from an electronic key of a user and also permitting startup of the engine according to user's operation, which are connected to each other via a communication line Lc.

Furthermore, a gateway ECU 130 is provided for relay of data among respective networks (i.e., among the communication lines La, Lb, and Lc). The gateway ECU 130 allows individual ECUs belonging to mutually different networks to exchange their data (for example, refer to FIG. 2 of the Japanese Patent Application Laid-open No. 5-85228 (1993) corresponding to the U.S. Pat. No. 5,351,776; FIG. 1 of the Japanese Patent Application Laid-open No. 10-250417 (1998) corresponding to the U.S. Pat. No. 6,154,688, and FIG. 2 of the Japanese Patent Application Laid-open No. 2000-71819 corresponding to the U.S. Pat. No. 6,292,741.

However, according to the integrated vehicle control system using the above-described conventional network, it was difficult to efficiently execute abnormality detection ranging widely and covering the entire apparatuses of this control system.

More specifically, according to the conventional integrated vehicle control system, each ECU connected to the communication line obtains various data (i.e., control information and requests) from other ECUs, and determines control amounts to be supplied to its managing devices and controls the devices based on the determined control amounts for realizing intended controls. In this respect, each ECU operates independently or selfishly and determines the behavior based on its own intent or judgment. Accordingly, it was inevitably necessary to give the abnormality detecting function to each ECU, so that each ECU can detect any abnormality occurring in the inside of each ECU or in its managing control objective devices. In other words, it was impossible to execute detailed abnormality detection capable of ranging widely and covering the entire apparatuses of the control system and accurately identifying the root of each abnormality.

For example, the automatic transmission may fail to smoothly execute the gear shift operation. The cause of this failure may reside in the automatic transmission itself, or may be originated from an engine when the engine has abnormality in its output torque. According to the conventional system shown in FIG. 7, even if the failure of the gear shift operation is originated from the engine having abnormality in its output torque, the ECT/ECU 103 will judge it as the failure caused in the automatic transmission itself. Then, to eliminate, correct, or avoid the detected abnormality, the ECT/ECU 103 executes fail-safe processing applied to the automatic transmission.

Furthermore, due to abnormality of engine output, the cruise control or the traction control may not be performed appropriately. In such a case, instead of the engine ECU 101, the ACC/ECU 102 or the brake ECU 104 is forced to detect the abnormality and execute any fail-safe processing. In this manner, according to the conventional control system, it was usual that the ECU in charge of a post-processing device (such as the automatic transmission, the brake system, or the like) has the responsibility against the abnormality occurring in a preprocessing device (such as the engine) managed by other ECU.

Furthermore, according to the above-described conventional integrated vehicle control system, the data amount (i.e., communication data volume) transmitted or received via the communication line is so large that the recent requirements for multi-functions and high performance cannot be realized.

Namely, according to the conventional integrated vehicle control system, as described previously, each ECU operates independently or selfishly and determines the behavior based on its own intent or judgment. If required to smoothly control various devices installed in a vehicle based on mutual cooperation, respective ECUs are required to speedily exchange many and various kinds of required data. For example, according to the conventional example shown in FIG. 7, to smoothly control the engine and the automatic transmission, the engine ECU 101 must supply various control data and various requests to the ECT/ECU 103. Such control data include "engine rotational speed", "actual throttle opening degree", "information relating to engine torque", "ignition timing", "information as to whether fuel cut is executing or not", "rotational speed at which fuel cut is to be stopped", "estimated time of fuel cut", "air-conditioning ON/OFF information" or the like. The various requests include "third-gear speed prohibition request", "fourth-gear speed prohibition request", "lockup release request" or the like. The data exchange between the ECUs is not limited within the same network. It is therefore necessary for the ECUs belonging to mutually different networks to exchange a great amount of data.

SUMMARY OF THE INVENTION

In view of the above-described problems, the present invention has an object to provide an integrated vehicle control system which is capable of efficiently executing abnormality detection ranging widely and covering the entire apparatuses of this control system and also capable of reducing the communication data amount transmitted or received via the networks.

In order to accomplish the above and other related objects, the present invention provides a first integrated vehicle control system including a plurality of electronic control apparatuses connected via at least one communication line so as to communicate with each other for controlling specific functions of a vehicle. One of the plurality of electronic control apparatuses functions as an overall control apparatus for transmitting operation directives to other electronic control apparatuses, each functioning as an individual control apparatus, to cause respective individual control apparatuses to operate subordinately according to the given operation directives, thereby realizing a collective control of the specific functions. The overall control apparatus determines the operation directives supplied to the individual control apparatuses based on information obtained via the communication line from respective individual control apparatuses, and executes abnormality detection processing for detecting abnormality occurring in the integrated vehicle control system.

According to the first integrated vehicle control system of this invention, all of the electronic control apparatuses need not to operate independently or selfishly. One overall control apparatus in each network, selected or designated among these electronic control apparatuses, determines and transmits the operation directives to be supplied to each individual control apparatus based on the information obtained via the communication line from the individual control apparatuses, thereby collectively control the functions of this control system.

Namely, except for the limited number of electronic control apparatuses designated as overall electronic control apparatus, many of the electronic control apparatuses (i.e., individual control apparatuses) operate subordinately.

Furthermore, the overall control apparatus executes the abnormality detection processing for detecting the abnormality occurring in this control system. The first integrated vehicle control system of this invention makes it possible to efficiently execute the abnormality detection ranging widely and covering the entire apparatuses of this control system, and also makes it possible to correctly identify the root (main cause) of the detected abnormality considering the overall conditions of this control system. Thus, the fail-safe processing can be executed effectively and appropriately.

More specifically, the overall control apparatus transmits the operation directives to respective individual electronic control apparatuses. The operation directives transmitted from the overall control apparatus include the command information relating to target operation conditions of control objective devices managed by each individual control apparatus. Each individual control apparatus controls its own control objective devices to operate under the target operation conditions designated by the operation directives received from the overall control apparatus.

Preferably, the overall control apparatus obtains condition data from the individual control apparatuses. The condition data, in this case, represent operating conditions of the control objective devices controlled by the individual control apparatuses based on the operation directives. The overall control apparatus executes the abnormality detection processing by detecting abnormality based on the obtained condition data and identifying an abnormal portion.

According to this arrangement, it becomes easy to accurately identify a specific individual control apparatus relating to the detected abnormality. Therefore, it becomes possible to appropriately execute the fail-safe processing efficiently in accordance with the real root or cause of the detected abnormality.

Furthermore, according to the first integrated vehicle control system of this invention, the data amount (i.e., communication data amount) exchanged among the electronic control apparatuses can be reduced greatly. Namely, one overall control apparatus collectively controls the functions of this control system. In other words, the remaining electronic control apparatuses need not exchange a great amount of control data via the networks. Hence, it becomes possible to assure satisfactory control performance even when the communication speed is set to a relatively lower level.

Furthermore, according to the first integrated vehicle control system of this invention, the operation of each individual control apparatus becomes simple because each individual control apparatus can operate in obedience to the operation directives given from the overall control apparatus. For example, the engine ECU receives a target output torque as one of the operation directives and actuates its managing actuators to generate the target output torque. This makes it possible to design or develop each electronic control apparatus individually without considering the relationship to other electronically controlled devices to be assembled in the integrated vehicle control system.

Accordingly, a short-term development of a complicated control system can be realized. Modified variations for the developed system can be speedily done. One the other hand, the conventional control system requires designing and developing each apparatus considering the data to be transmitted among different apparatuses in the entire system. This invention eliminates such necessities.

Furthermore, even in an event that the control specifications are changed, no adverse influence is given to the contents of communication data. Thus, the communication data can be easily standardized.

Preferably, the overall control apparatus executes gateway processing by selecting information necessary for other network from information received via the communication line from respective individual control apparatuses and transmitting the selected information via a host network to another overall control apparatus, thereby allowing mutual exchange of information between individual control apparatuses of differently functionalized networks. According to this arrangement, the data amount exchanged among the functionalized networks can be optimized effectively.

The present invention provides a second integrated vehicle control system including a plurality of networks connecting a plurality of electronic control apparatuses via a plurality of communication lines to communicate with each other. Each network is provided for one or a plurality of functions of a vehicle. One electronic control apparatus connected to each of the plurality of communication lines of the plurality of networks is a vehicle overall control apparatus for transmitting operation directives to other electronic control apparatuses, each functioning as an individual control apparatus of each network. The vehicle overall control apparatus causes respective individual control apparatuses to operate according to the given operation directives, thereby realizing a collective control of the functions of each network. The vehicle overall control apparatus determines the operation directives supplied to the individual control apparatuses based on information obtained via the communication lines from the individual control apparatuses, and executes abnormality detection processing for detecting abnormality occurring in the integrated vehicle control system. Furthermore, the vehicle overall control apparatus executes gateway processing by selecting information necessary for other network from information received via the communication lines and transmitting the selected information via a communication line of a corresponding network, thereby allowing mutual exchange of information between individual control apparatuses of different networks.

According to the second integrated vehicle control system of this invention, all of electronic control apparatuses need not operate independently or selfishly. One vehicle overall control apparatus, selected among these electronic control apparatuses, determines and transmits the operation directives to be supplied to each individual control apparatus of each network based on the information obtained via the communication lines from the individual control apparatuses, thereby collectively control the functions of each network as well as functions of this control system. Furthermore, the vehicle overall control apparatus executes the abnormality detection processing for detecting the abnormality occurring in this control system. Accordingly, this invention makes it possible to efficiently execute the abnormality detection ranging widely and covering the entire apparatuses of this control system, and also makes it possible to correctly identify the real root of the detected abnormality considering the overall conditions of this control system. Thus, the fail-safe processing can be executed appropriately.

More specifically, the vehicle overall control apparatus transmits the operation directives to respective individual electronic control apparatuses. The operation directives transmitted from the vehicle overall control apparatus include the command information relating to target operation conditions of control objective devices managed by each individual control apparatus. Each individual control apparatus controls its own control objective devices to operate subordinately under the target operation conditions designated by the operation directives received from the vehicle overall control apparatus.

Preferably, the vehicle overall control apparatus obtains condition data from the individual control apparatuses. The condition data, in this condition, represent operating conditions of control objective devices controlled based on the operation directives by the individual control apparatuses. The vehicle overall control apparatus executes the abnormality detection processing by detecting abnormality based on the obtained condition data and identifying an abnormal portion.

Furthermore, according to the second integrated vehicle control system of this invention, the data amount (i.e., communication data amount) exchanged among the electronic control apparatuses can be reduced greatly. Hence, it becomes possible to design or develop each electronic control apparatus individually. A short-term development of a complicated control system can be realized. The communication data can be easily standardized.

Furthermore, according to the second integrated vehicle control system of this invention, the information to be transmitted from one network of a particular function to another network of different function is selected beforehand by the gateway processing of the vehicle overall control apparatus. Accordingly, the data amount exchanged among various functionalized networks can be optimized to a smaller level.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Hereinafter, preferred embodiments of the present invention will be explained with reference to attached drawings.

FIRST EMBODIMENT

Figure 1:
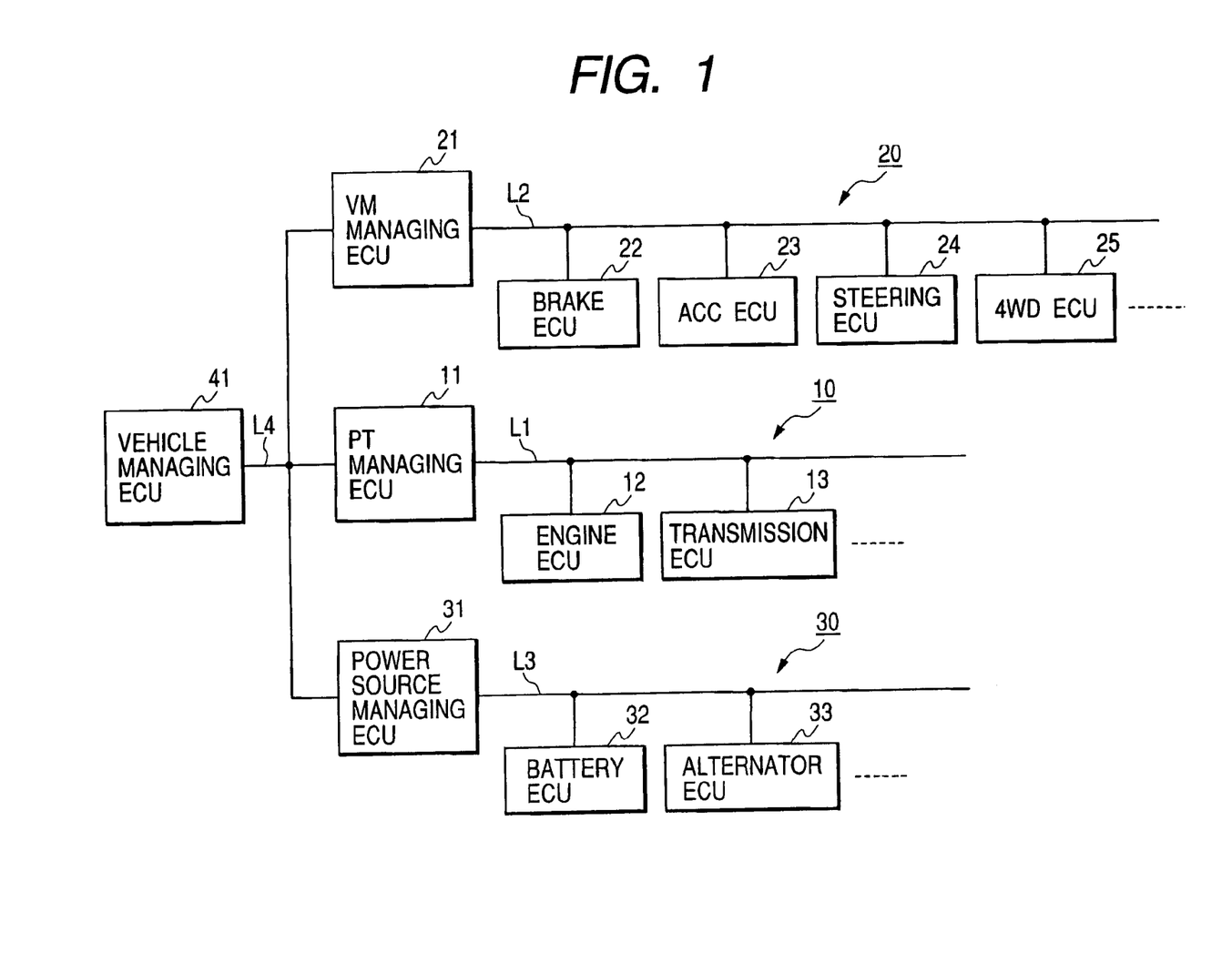
FIG. 1 is a block diagram showing the schematic arrangement of an integrated vehicle control system in accordance with a first embodiment of the present invention.

FIG. 1 is a block diagram showing the arrangement of an integrated vehicle control system in accordance with a first embodiment of this invention.

As shown in FIG. 1, the integrated vehicle control system of the first embodiment includes a power train network (i.e., a network for controlling power train devices) 10, a vehicle motion network (i.e., a network for controlling vehicle behaviors) 20, and a power source network (i.e., a network for controlling internal power sources equipped in an automotive vehicle) 30.

The power train network 10 includes an engine ECU 12 controlling an engine, a transmission ECU 13 controlling an automatic transmission, and a PT (i.e., Power Train) managing ECU 11 outputting operation directives to these ECUs 12 and 13 for collectively controlling the functions relating to driving force control of an automotive vehicle. The engine ECU 12, the transmission ECU 13, and the PT managing ECU 11 are mutually connected via a communication line L1 for data communications.

The vehicle motion network 20 includes a brake ECU 22 controlling a brake system, an ACC (i.e., Adaptive Cruise Control) ECU 23 controlling the distance to a preceding vehicle or maintaining a constant traveling speed of the vehicle, a steering ECU 24 controlling a steering system, a 4WD (i.e., 4 Wheel Drive) ECU 25 controlling driving power distribution to front and rear driving wheels, and a VM (i.e., Vehicle Motion) managing ECU 21 outputting operation directives to these ECUs 22–25 for collectively controlling the functions relating to behavior control of the automotive vehicle. The brake ECU 22, the ACC/ECU 23, the steering ECU 24, the 4WD ECU 25, and the VM managing ECU 21 are mutually connected via a communication line L2 for data communications.

The power source network 30 includes a battery ECU 32 monitoring the state-of-charge of an automotive battery installed in an engine room or the like, an alternator ECU 33 controlling an alternator (i.e., AC power generator) associated with the engine, and a power source managing ECU 31 outputting operation directives to these ECUs 32 and 33 for collectively controlling the functions relating to power source control of the automotive vehicle. The battery ECU 32, the alternator ECU 33, and the power source managing ECU 31 are mutually connected via a communication line L3 for data communications.

The above-described managing ECUs 11, 21, and 31 (corresponding to overall control apparatus of the present invention) of respective functionalized networks 10, 20, and 30 are connected to a vehicle managing ECU 41 via a host communication line L4 provided independently from the communication lines L1 to L3 of respective functionalized networks 10, 20, and 30.

Each of the above-described ECUs is equipped with a microprocessor which executes computational processing in compliance with various control programs for controlling various control objective devices installed in the automotive vehicle. Especially, the PT managing ECU 11 incorporates the algorithm serving as a coordinator for collectively controlling the power train devices. The VM managing ECU 21 incorporates the algorithm serving as a coordinator for collectively controlling the vehicle behaviors. The power source managing ECU 31 incorporates the algorithm serving as a coordinator for collectively controlling the power sources. And, the vehicle managing ECU 41 incorporates the algorithm serving as a coordinator for collectively controlling all of the devices or systems installed in the automotive vehicle.

Each of managing ECUs 11, 21, and 31 of respective functionalized networks 10, 20, and 30 determines control target values to be supplied as operation directives to respective ECUs belonging to its own network based on the information obtained via each individual communication line from respective ECUs of its own network as well as the information obtained via the host communication line L4 from other ECUs of different network or the information obtained from the vehicle managing ECU 41. Each of managing ECUs 11, 21, and 31 supplies the determined control target values (i.e., operation directives) to corresponding ECUs via the communication line of its own network.

On the other hand, the remaining ECUs (corresponding to individual control apparatuses of the present invention) other than the managing ECUs 11, 21, and 31 in respective networks 10, 20, and 30 transmit to their managing ECUs the control information (i.e., condition data representing operating conditions of their control objective devices). The respective individual ECUs other than the managing ECUs 11, 21, and 31 in respective networks 10, 20, and 30 control their own control objective devices in such a manner that the control target values transmitted as operation directives from their managing ECUs can be attained.

Figure 2:
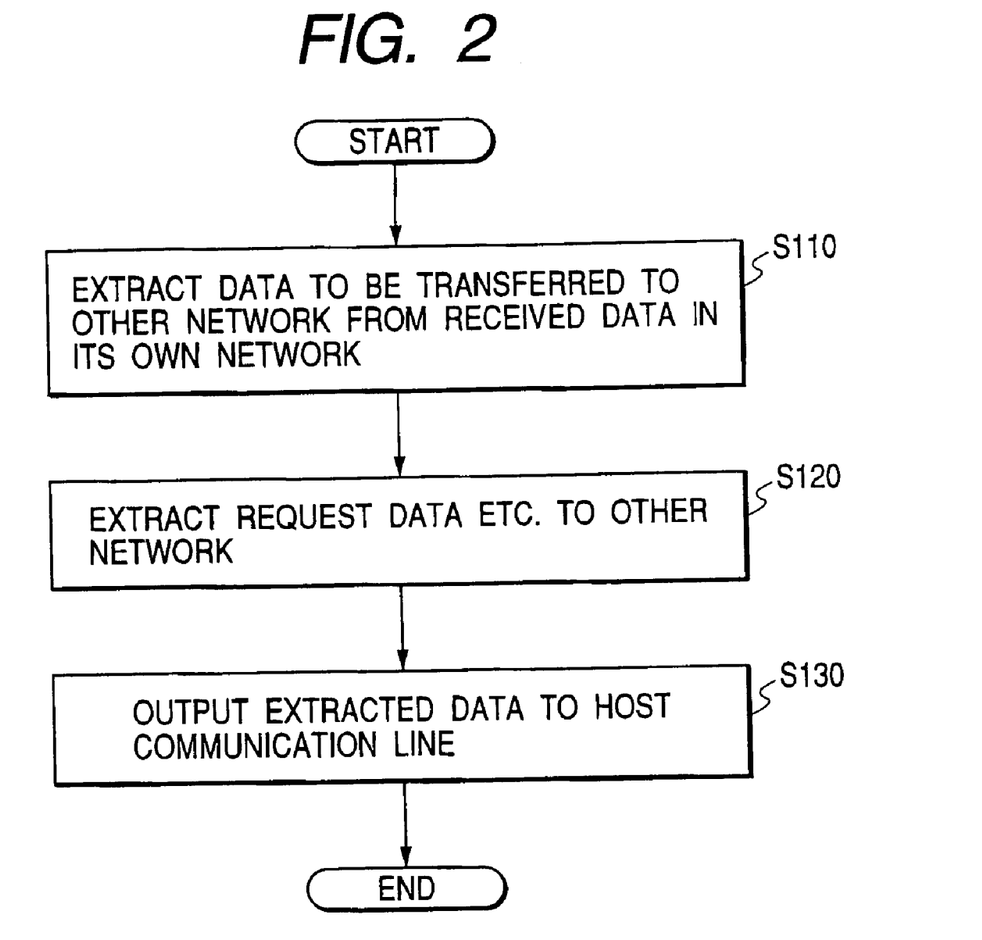
FIG. 2 is a flowchart showing part of the operation executed by a managing ECU in each network in accordance with the first embodiment of the present invention.

Furthermore, through the processing shown in FIG. 2 which is executed at predetermined time intervals, the managing ECUs 11, 21, and 31 in respective functionalized networks 10, 20, and 30 receive the data (i.e., information) from individual ECUs of their own networks via individual communication lines L1, L2, and L3 and extract the data to be transferred to other network from the received data (step S110). Then, from the information obtained through their internal calculations, the managing ECUs 11, 21, and 31 in respective functionalized networks 10, 20, and 30 extract the information and request data to be supplied to other network (step S424 120). Then, the managing ECUs 11, 21, and 31 in respective functionalized networks 10, 20, and 30 output the data extracted in respective steps S110 and S120 to the host communication line L4 (step S130).

Each managing ECU has a ROM or another comparable nonvolatile memory for storing beforehand a list of the objects to be transmitted as the data (information). The above-described processing of steps S110 to S130 performed in the first embodiment corresponds to gateway processing.

Furthermore, the vehicle managing ECU 41 receives the requests transmitted from the managing ECUs 11, 21, and 31 in respective functionalized networks 10, 20, and 30 as well as necessary some of control data (i.e., information) transmitted from these managing ECUs 11, 21, and 31. The vehicle managing ECU 41 totally arbitrates the requests received from respective managing ECUs 11, 21, and 31 and transmits the control target values as operation directives to the managing ECUs 11, 21, and 31 in respective functionalized networks 10, 20, and 30.

Each ECU operates in the following manner.

The control target values (i.e., the operation directives) transmitted from the host ECU to subordinate ECUs are referred to as "order" in the following description.

Figure 3:
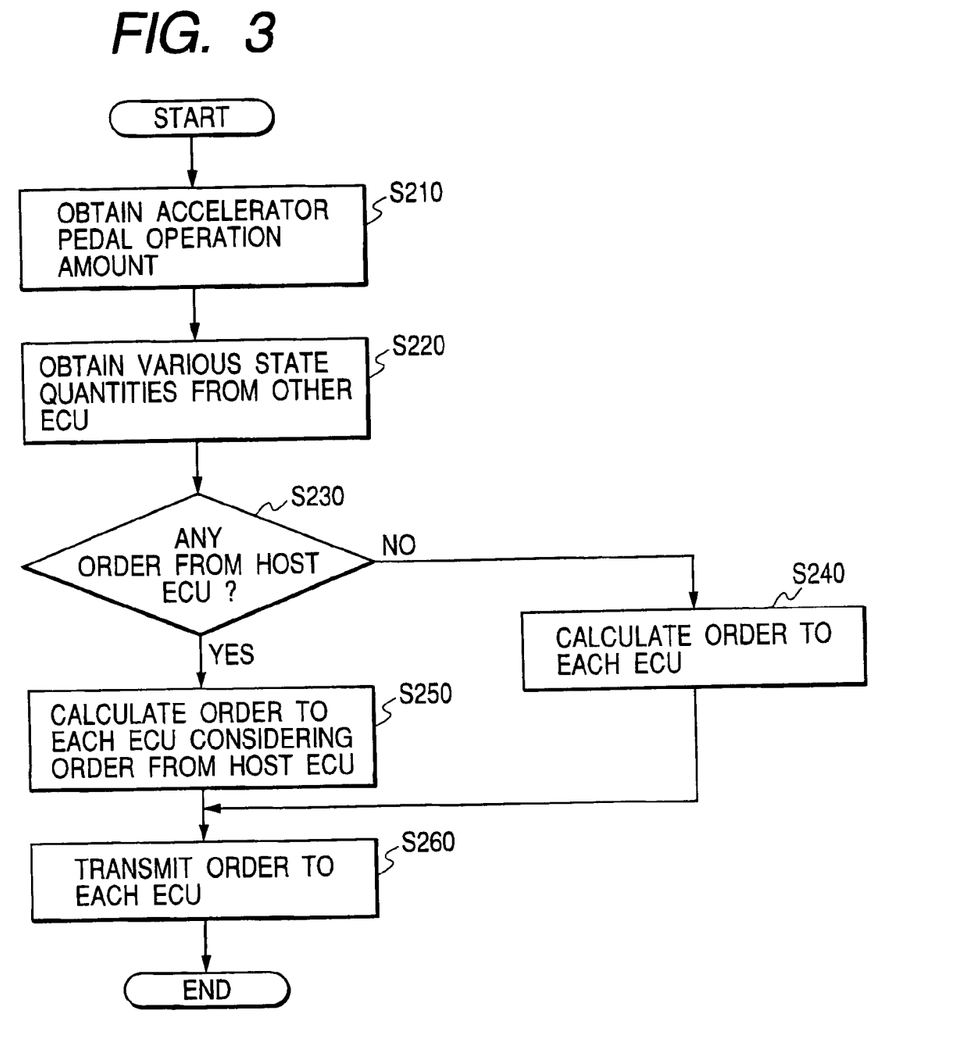
FIG. 3 is a flowchart showing the operation executed by a PT managing ECU in accordance with the first embodiment of the present invention.

First, as shown in FIG. 3, the PT managing ECU 11 obtains a detection signal from an accelerator sensor which represents an operation amount of an accelerator pedal depressed by a driver (step S210). Then, the PT managing ECU 11 obtains various condition data (hereinafter, referred to as state quantities), such as present data of engine rotational speed, engine cooling water temperature, shift lever position, and input/output rotational speeds of the automatic transmission, via the communication line L1 from individual ECUs 12, 13, - - - in the power train network 10 (step S220). In this case, the PT managing ECU 11 may obtain the accelerator pedal operation amount from communication data obtained from other ECU, not from the accelerator sensor.

Next, it is checked whether or not any order is received from host CU (step S230). In this case, the host ECU is the vehicle managing ECU 1. For example, described later, the order transmitted from the vehicle managing ECU 41 includes a target output shaft torque of the automatic transmission determined by the vehicle managing ECU 41 in accordance with the requests of the VM managing ECU 21 and the power source managing ECU 31.

When no order is received from the vehicle managing ECU 41 (i.e., NO in step S230), the PT managing ECU 11 calculates a target output shaft torque of the automatic transmission for optimizing the operations of the power train considering fuel economy, exhaust gas emission, comfortableness or the like based on the accelerator pedal operation amount, the shift lever position and the like. Furthermore, the PT managing ECU 11 calculates the order to be transmitted to individual ECUs 12, 13, - - - in the power train network 10 with reference to the various state quantities obtained in the above-described step S220 so that the target output shaft torque of the automatic transmission can be realized in the power train network 10 (step S240).

On the other hand, when any order is received from the vehicle managing ECU 41 (i.e., YES in step S230), the PT managing ECU 11 fundamentally performs the processing similar to that performed in the above-described step S240 but considering the order given from the vehicle managing ECU 41. Namely, the PT managing ECU 11 determines a target output shaft torque of the automatic transmission considering the order from the vehicle managing ECU 41, and calculates the order to be transmitted to individual ECUs 12, 13, - - - in the power train network 10 with reference to the various state quantities obtained in the above-described step S220 so that the target output shaft torque of the automatic transmission can be realized in the power train network 10 (step S250).

Then, the PT managing ECU 11 transmits the order calculated in the above-described step S240 or S250 to individual ECUs 12, 13, - - - via the communication line L1 (step S260).

For example, the order given to the engine ECU 12 includes a target engine output torque (i.e., requisite engine torque). The order given to the transmission ECU 13 includes a target gear ratio (i.e., requisite gear ratio). Furthermore, a practical value of each order is determined within a realizable range based on the information obtained from respective individual ECUs.

On the other hand, the engine ECU 12 calculates an intake air amount, a fuel injection amount, and ignition timing for realizing the order (i.e., requisite engine torque) given from the PT managing ECU 11. Then, the engine ECU 12 outputs instructions to various engine control actuators, such as electronically controlled throttle, injector, and igniter, based on the calculated result. Furthermore, the engine ECU 12 inputs the signals from various sensors (not shown) including a crank angle sensor and a cooling water temperature sensor connected to the engine ECU 12, and obtains estimated present values of engine rotational speed, engine cooling water temperature, crank shaft torque (engine output torque) or the like. These estimated values are transmitted as engine operating condition data to the PT managing ECU 11 via the communication line L1 and used for calculating control data in the PT managing ECU 11.

Meanwhile, the VM managing ECU 21 obtains the accelerator pedal operation amount from the PT managing ECU 11 via the communication line L4 and also obtains physical quantities representing present vehicle behavior from individual ECUs 22, 23, - - - in the vehicle motion network 20 via the communication line L2. The physical quantities representing present vehicle behavior include actual brake pedal operation amount, actual steering operation amount, actual back and forth accelerations, actual lateral acceleration, actual yaw rate and actual wheel speeds of the vehicle. The VM managing ECU 21 calculates various target values of vehicle behavior, including target back and forth accelerations, target lateral acceleration, target yaw rate, target tire ground contact area force, or the like of the vehicle based on the obtained information.

Then, the VM managing ECU 21 calculates the order (i.e., the order for attaining the target values of vehicle behavior) given to the ECUs 22, 23, - - - in the vehicle motion network 20 based on the above-described target values of vehicle behavior. The VM managing ECU 21 transmits each order to a corresponding ECU via the communication line L2. For example, the order transmitted from the VM managing ECU 21 to the brake ECU 22 includes a target brake force. The order transmitted from the VM managing ECU 21 to the 4WD ECU 25 includes a target distribution ratio of back and forth driving forces.

Meanwhile, the VM managing ECU 21 calculates an automatic transmission output shaft torque for realizing the above-described calculated target values of vehicle behavior. Then, the VM managing ECU 21 transmits the calculate value as a control request value to the vehicle managing ECU 41.

On the other hand, the power source managing ECU 31 obtains state-of-charge information of the battery from the battery ECU 32 via the communication line L3. Furthermore, the power source managing ECU 31 obtains a realizable range of the power generation amount (i.e., a range of a present power amount generatable by the alternator) from the alternator ECU 33 via the communication line L3. Moreover, the power source managing ECU 31 obtains the information of overall electric power consumption in the power train network 10 as well as overall electric power consumption in the vehicle motion network 20 from the vehicle managing ECU 41 via the communication line L4.

Then, the power source managing ECU 31 calculates based on the obtained information a target value of power generation amount for the alternator capable of maintaining (or shifting) the state-of-charge of the battery to an adequate level. The power source managing ECU 31 transmits the calculated target power generation amount as an order to the alternator ECU 33 via the communication line L3. The overall electric power consumption in the power train network 10 is successively and momentarily calculated in the PT managing ECU 11 and is transmitted to the vehicle managing ECU 41. Similarly, the overall electric power consumption in the vehicle motion network 20 is successively and momentarily calculated in the VM managing ECU 21 and is transmitted to the vehicle managing ECU 41. However, it is possible to directly transmit the calculated overall electric power consumption data to the power source managing ECU 31 from each of the PT managing ECU 11 and the VM managing ECU 21 without requiring intermediation by the vehicle managing ECU 41.

Furthermore, the power source managing ECU 31 calculates an automatic transmission output shaft torque consumed in the power source group (chiefly in the alternator) in accordance with the target value of the power generation amount in the alternator. Then, the power source managing ECU 31 transmits the calculated value as a control request value to the vehicle managing ECU 41.

Meanwhile, the vehicle managing ECU 41 calculates a target automatic transmission output shaft torque to be realized in the power train network 10 based on the control request value sent from the VM managing ECU 21 and the control request value sent from the power source managing ECU 31. The vehicle managing ECU 41 transmits the calculated target automatic transmission output shaft torque as an order to the PT managing ECU 11 via the communication line L4.

Accordingly, through the previously described processing of steps S250 and S260 shown in FIG. 3, the PT managing ECU 11 calculates and transmits the orders of target engine output torque, target gear ratio, or the like to be given to the individual ECUs 12, 13, - - - in the power train network 10 so that the automatic transmission output shaft torque can be optimized.

Furthermore, according to the integrated vehicle control system in the first embodiment, each of the managing ECUs 11, 21, and 31 of respective networks executes abnormality detection processing for detecting occurrence of abnormality in its own network based on various condition data obtained from respective ECUs belonging to its own network and also identifying the position where the abnormality has occurred.

Figure 4:
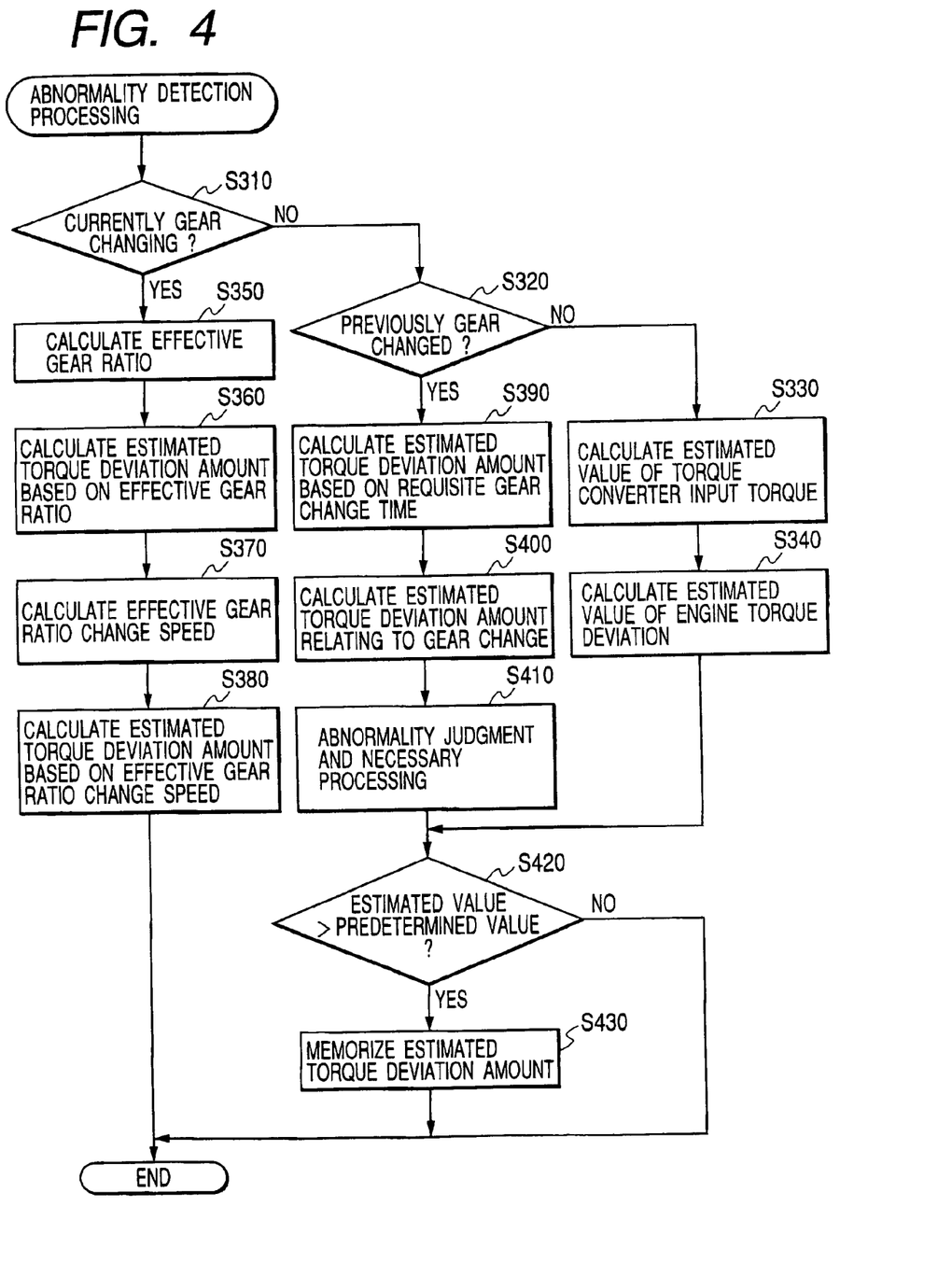
FIG. 4 is a flowchart showing abnormality detection processing executed by the PT managing ECU in accordance with the first embodiment of the present invention.

For example, the PT managing ECU 11 executes the abnormality detection processing shown in FIG. 4 at predetermined time intervals. More specifically, the PT managing ECU 11 starts the abnormality detection processing and at the first step S310 makes a judgment based on gear change start/end information obtained from the transmission ECU 13 as to whether or not the automatic transmission is currently executing the gear shift operation.

When the automatic transmission is not currently executing the gear shift operation (i.e., NO in step S310), the control flow of PT managing ECU 11 proceeds to step S320 to further make a judgment whether or not the automatic transmission was executing the gear shift operation in the previous abnormality detection processing (i.e., in the previous routine). When the automatic transmission was not previously executing the gear shift operation (i.e., NO in step S320), the PT managing ECU 11 concludes that the present abnormality detection processing is not the first processing (i.e., the second or succeeding processing) performed after accomplishing the gear shift operation. And, the control flow proceeds to step S330.

In the step S330, the PT managing ECU 11 calculates an estimated torque converter input torque amount (i.e., an estimated value of input torque of the torque converter (=an estimated value of engine output torque)) based on an engine rotational speed NE representing the rotational speed of an input shaft of the torque converter and an automatic transmission input rotational speed (i.e., a so-called turbine rotational speed) N1 representing the rotational speed of an output shaft of the torque converter. The engine rotational speed NE is successively and momentarily transmitted from the engine ECU 12 to the PT managing ECU 11. The automatic transmission input rotational speed N1 is successively and momentarily transmitted from the transmission ECU 13 to the PT managing ECU 11.

Next, in the step S340, the PT managing ECU 11 calculates an estimated deviation amount of an engine output torque (hereinafter, referred to as "estimated engine torque deviation amount") based on the present and past values of the difference between the estimated torque converter input torque amount calculated in the step S330 and the estimated value of the engine output torque transmitted from the engine ECU 12. Then, the control flow proceeds to later-described step S420. Regarding the calculation in the step S340, it is possible to replace the estimated value of the engine output torque transmitted from the engine ECU 12 by the target engine output torque given as an order to the engine ECU 12.

As described above, in the second or succeeding abnormality detection processing performed after accomplishing the gear shift operation, the torque deviation amount relating to the engine output torque entered into the automatic transmission is calculated through the processing of steps S330 and S340.

On the other hand, when the automatic transmission is currently executing the gear shift operation (i.e., YES in step S310), the control flow of PT managing ECU 11 proceeds to step S350 to calculate an effective gear ratio of the automatic transmission. The effective gear ratio is defined as a ratio of the automatic transmission input rotational speed N1 to an automatic transmission output rotational speed N2. The automatic transmission output rotational speed N2 is successively and momentarily transmitted together with the automatic transmission input rotational speed N1 from the transmission ECU 13 to the PT managing ECU 11.

Then, in step S360, the PT managing ECU 11 calculates an estimated automatic transmission output torque deviation amount based on the effective gear ratio calculated in the above-described step S350. The estimated automatic transmission output torque deviation amount is an estimated value of the deviation amount of actual output torque relative to an ideal output torque of the automatic transmission. More specifically, the gear ratio mechanically determined with reference to the gear shift positions before and after the gear shift operation is compared with the present and past values of the effective gear ratio calculated in the step S350. Then, the estimated automatic transmission output torque deviation amount is calculated based on the comparison result. Hereinafter, the estimated automatic transmission output torque deviation amount calculated in the step S360 is referred to as "estimated torque deviation amount based on effective gear ratio."

Next, in step S370, the PT managing ECU 11 calculates an effective gear ratio change speed. The effective gear ratio change speed is calculated from a difference between the previous and present values of the effective gear ratio.

Then, in step S380, the PT managing ECU 11 calculates the estimated automatic transmission output torque deviation amount based on the effective gear ratio change speed calculated in the above-described step s370. More specifically, the effective gear ratio change speed is compared with a predetermined range being set beforehand as an appropriate range for the effective gear ratio change speed. The estimated automatic transmission output torque deviation amount is calculated based on the compared relationship. Then, the abnormality detection processing is accomplished. Hereinafter, the estimated automatic transmission output torque deviation amount calculated in the step S380 is referred to as "estimated torque deviation amount based on effective gear ratio change speed."

As described above, when the automatic transmission is currently executing the gear shift operation, the estimated automatic transmission output torque deviation amount is calculated based on the effective gear ratio (step S360) and is also calculated based on effective gear ratio change speed (step S380).

Meanwhile, when the automatic transmission was previously executing the gear shift operation (i.e., YES in step S320), the PT managing ECU 11 concludes that the present abnormality detection processing is the first processing (i.e., not the second or succeeding processing) performed immediately after accomplishing the gear shift operation. And, the control flow proceeds to step S390.

In step S390, the PT managing ECU 11 obtains a requisite gear change time (i.e., a time required for accomplishing the gear shift operation) based on the gear change start/end information supplied from the transmission ECU 13. And, the PT managing ECU 11 calculates the estimated automatic transmission output torque deviation amount based on the obtained requisite gear change time. More specifically, the above-described obtained requisite gear change time is compared with an optimum requisite gear change time being set beforehand for each of various conditions. The estimated automatic transmission output torque deviation amount is calculated based on the compared relationship. Hereinafter, the estimated automatic transmission output torque deviation amount calculated in the step S390 is referred to as "estimated torque deviation amount based on requisite gear change time."

Then, in step S400, the PT managing ECU 11 calculates a final estimated automatic transmission output torque deviation amount based on the "estimated torque deviation amount based on effective gear ratio" calculated in the step S360, the "estimated torque deviation amount based on effective gear ratio change speed" calculated in the step S380, and the "estimated torque deviation amount based on requisite gear change time" calculated in the step S390. In this case, the final estimated automatic transmission output torque deviation amount is calculated by inputting the above-described three estimated torque deviation amounts as parameters into a predetermined equation. Hereinafter, the final estimated automatic transmission output torque deviation amount calculated in the step S400 is referred to as "estimated torque deviation amount based on gear change."

Next, in step S410, the PT managing ECU 11 judges the presence of any abnormality and executes necessary processing for eliminating or avoiding the detected abnormality.

More specifically, the "estimated torque deviation amount based on gear change" calculated in the step S400 is compared with a threshold value being prepared beforehand for abnormality judgment. Then, based on the comparison result in largeness, the PT managing ECU 11 makes a judgment as to whether or not fail-safe processing should be executed to improve the gear shift operation. (Namely, as to whether or not any abnormality occurs in the power train group.

When the fail-safe processing is necessary, the PT managing ECU 11 identifies the position where the abnormality has occurred by comparing the "estimated torque deviation amount based on gear change" calculated in the step S400 with the "estimated engine torque deviation amount" calculated in step S340. For example, it is now assumed that MA represents the "estimated torque deviation amount based on gear change" and MB represents the "estimated engine torque deviation amount." When the relationship MB>MA×α is established (where, α is a positive value less than 1), it is concluded that the automatic transmission output torque deviation is induced by the engine output torque deviation. Thus, the PT managing ECU 11 concludes that the detected abnormality has occurred from the engine. On the contrary, when the relationship MB>MA×α is not established, the PT managing ECU 11 concludes that the detected abnormality has occurred in the automatic transmission.

Then, with reference to the position of abnormality (i.e., according to the fundamental cause of abnormality), the PT managing ECU 11 executes appropriate fail-safe processing. For example, when the abnormality has occurred in the engine, the PT managing ECU 11 corrects the target engine output torque supplied to the engine ECU 12. When the abnormality has occurred in the automatic transmission, the PT managing ECU 11 corrects the engine torque information supplied to the transmission ECU 13 or prohibits the gear shift operation performed in the automatic transmission.

Then, in step S420, the PT managing ECU 11 makes a judgment as to whether or not each estimated torque deviation amount calculated in the step S400 or S340 is larger than a predetermined constant value. When the estimated torque deviation amounts calculated in the step S400 and S340 are not larger than the predetermined constant value (i.e., NO in step S420), this abnormality detection processing is accomplished immediately. However, when at least one of the estimated torque deviation amounts calculated in the step S400 and S340 is larger than the predetermined constant value (i.e., YES in step S420), the PT managing ECU 11 stores the estimated torque deviation amounts calculated in the step S400 and S340 in its nonvolatile memory (not shown), such as EEPROM or flash ROM, together with the cause of abnormality, contents of fail-safe processing, and its continuation time. Then, the PT managing ECU 11 accomplishes the abnormality detection processing. The estimated torque deviation amounts stored in the step S430 can be read out later by a failure diagnosis apparatus when this failure diagnosis apparatus is connected to the PT managing ECU 11 or to the vehicle managing ECU 41 in an automotive repair shop or the like.

According to the above-described integrated vehicle control system in accordance with the first embodiment, the managing ECUs 11, 21, and 31 are provided in respective networks classified into a plurality of functionalized groups, such as the power train group, the vehicle behavior group, and the power source group. The vehicle behavior group may be referred to as travel motion group in comparison with the power train group. Each of the managing ECUs 11, 21, and 31 determines the order to be supplied to its individual ECUs based on the information obtained from respective individual ECUs in its own network.

Each determined order is transmitted to a corresponding individual ECU to let the individual ECU operate in compliance with the given order. Thus, each of the managing ECUs 11, 21, and 31 collectively controls the functions designated to its own network. Furthermore, each of the managing ECUs 11, 21, and 31 executes the abnormality detection processing for detecting the abnormality occurring in its own network.

Accordingly, when each network is regarded as one control system, the abnormality detection can be executed efficiently so as to cover the entire control system. Furthermore, identifying the route of abnormality (i.e., the position of abnormality occurring in an individual ECU) can be executed so as to cover the entire control system. Thus, the fail-safe processing can be executed effectively in accordance with the fundamental cause of the detected abnormality.

Furthermore, according to the integrated vehicle control system of the first embodiment, the capability of the managing ECU in each network which collectively controls the functions designated to its own network makes it possible to eliminate a huge amount of data exchange between individual ECUs in the same network and also makes it possible to reduce the amount of data exchange between the ECUs of different networks. Accordingly, the first embodiment can assure satisfactory control performance even when the communication speed is set to a lower level.

For example, according to the conventional example shown in FIG. 7, to smoothly control the engine and the automatic transmission, the engine ECU 101 must transmit many and various engine control data to the ECT/ECU 103. The engine control data transmitted from the engine ECU 101 to the ECT/ECU 103 include "actual throttle opening degree", "engine torque reference value", "predicted estimated engine torque amount", "present estimated engine torque amount", "predicted intake air amount", "ignition timing", "fuel cut ON/OFF information", "rotational speed returning from fuel cut", "predicted fuel cut time", "air-conditioning ON/OFF information" and the like. Similarly, the ECT/ECU 103 must transmit many and various automatic transmission control data to the engine ECU 101. The automatic transmission control data transmitted from the ECT/ECU 103 to the engine ECU 101 include "highest speed gear prohibiting request", "reverse gear position prohibiting flag", "gear position signal", "R-range contact flag", "NDR gear change accomplishment information", "solenoid output duty ratio", "lockup ON engagement accomplishment information", "lockup ON/OFF judgment information" and the like.

On the contrary, according to the above-described first embodiment, the engine ECU 12 transmits to the PT managing ECU 11 only the above-described information with some additional information, such as "minimum and maximum engine torque values", "minimum and maximum engine rotational speed", and "engine operation flag." The transmission ECU 13 transmits to the PT managing ECU 11 only the above-described information with some other additional information, such as "present gear ratio" and "lockup condition."

Furthermore, according to the integrated vehicle control system of the first embodiment, each of the managing ECUs 11, 21, and 31 selects necessary information to be transmitted from its own network to other network of different function (steps S110 to S130). The data amount exchanged between different networks can be optimized and reduced greatly.

Furthermore, according to the integrated vehicle control system in accordance with the first embodiment, each individual ECU can operate subordinately in compliance with the order given from the managing ECU of its own network. Thus, development of each ECU can be done separately. Accordingly, development of mutually related and complicated control systems can be accomplished within a very short period of time. Modified variations for the developed system can be speedily done. Man-hour required for designing and developing the system can be greatly reduced. The quality can be improved.

Furthermore, the contents of communication data are not adversely influenced by the change of control specifications. The communication data can be easily standardized. According to the above-described first embodiment, each subordinate ECU transmits a control request to a host ECU and the host ECU returns a control target value (i.e., order) to the corresponding subordinate ECU based on the received control request. In this respect, the first embodiment of the present invention allows each ECU and the host ECU to perform the order/request type data communications. Standardizing the communication data exchanged between respective ECUs is easy. According to such standardization, the complicated control system can be developed with in a very short period of time.

As apparent from the foregoing description, the first embodiment of the present invention provides an integrated vehicle control system including a plurality of electronic control apparatuses connected via at least one communication line so as to communicate with each other for controlling specific functions of a vehicle. One of the plurality of electronic control apparatuses functions as an overall control apparatus (ECUs 11, 21, 31) for transmitting operation directives to other electronic control apparatuses, each functioning as an individual control apparatus (ECUs 12–13, 22–25, 32–33), to cause respective individual control apparatuses (ECUs 12–13, 22–25, 32–33) to operate subordinately according to the given operation directives, thereby realizing a collective control of the specific functions. The overall control apparatus (ECUs 11, 21, 31) determines the operation directives supplied to the individual control apparatuses (ECUs 12–13, 22–25, 32–33) based on information obtained via the communication line (L1–L3) from respective individual control apparatuses (ECUs 12–13, 22–25, 32–33), and executes abnormality detection processing for detecting abnormality occurring in the integrated vehicle control system.

According to the integrated vehicle control system of the first embodiment of this invention, all of the electronic control apparatuses need not to operate independently or selfishly. One overall control apparatus (ECUs 11, 21, 31) in each network (10, 20, 30), selected or designated among these electronic control apparatuses, determines and transmits the operation directives to be supplied to each individual control apparatus (ECUs 12–13, 22–25, 32–33) based on the information obtained via the communication line (L1–L3) from the individual control apparatuses, thereby collectively control the functions of this control system.

Namely, except for the limited number of electronic control apparatuses designated as overall electronic control apparatus (ECUs 11, 21, 31), many of the electronic control apparatuses (i.e., individual ECUs 12–13, 22–25, 32–33) operate subordinately in compliance with the given order.

Furthermore, the overall control apparatus (ECUs 11, 21, 31) executes the abnormality detection processing for detecting the abnormality occurring in this control system. The integrated vehicle control system of this embodiment makes it possible to efficiently execute the abnormality detection ranging widely and covering the entire apparatuses of this control system, and also makes it possible to correctly identify the root (main cause) of the detected abnormality considering the overall conditions of this control system. Thus, the fail-safe processing can be executed effectively and appropriately.

SECOND EMBODIMENT

Next, an integrated vehicle control system in accordance with a second embodiment will be explained.

Figure 5:
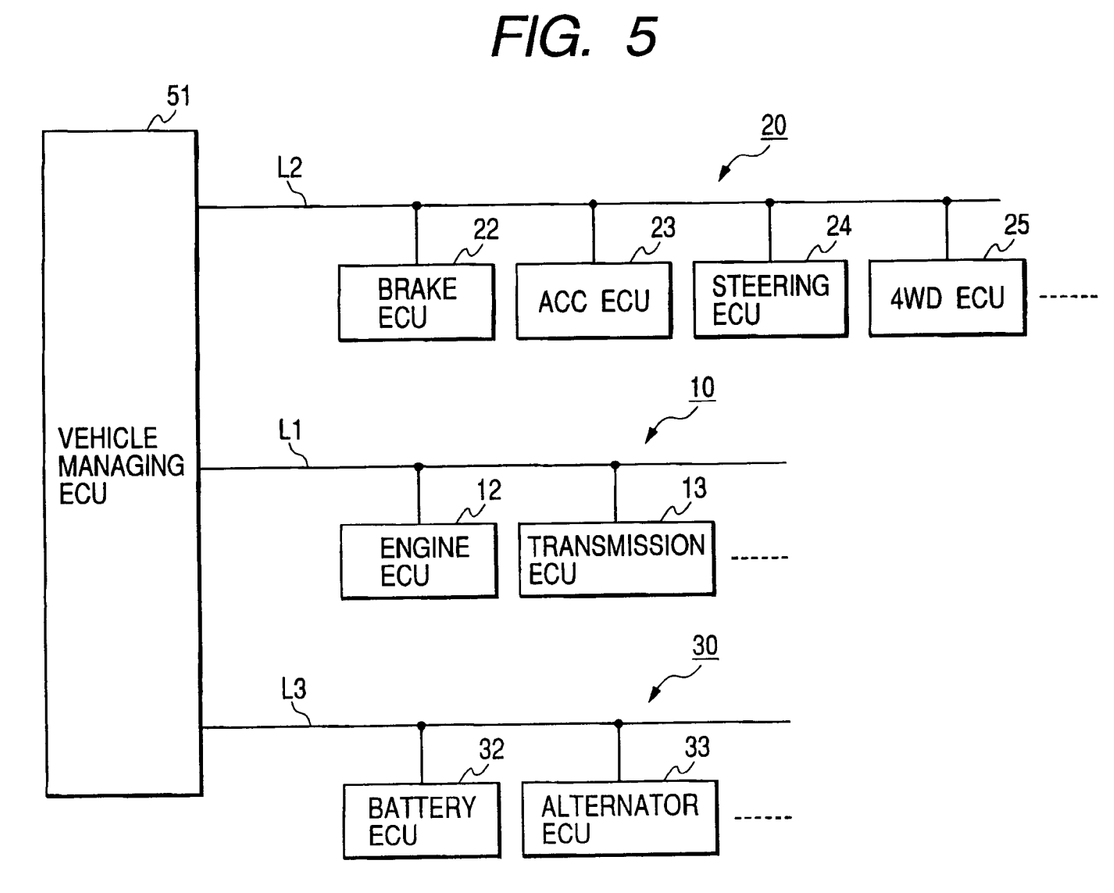
FIG. 5 is a block diagram showing the schematic arrangement of an integrated vehicle control system in accordance with a second embodiment of the present invention.

FIG. 5 is a block diagram showing the arrangement of the integrated vehicle control system in accordance with the second embodiment of this invention. In FIG. 5, the components identical with those disclosed in FIG. 1 are denoted by the same reference numerals and will not be explained again.

The integrated vehicle control system of the second embodiment is different from the integrated vehicle control system of the first embodiment in that the managing ECUs 11, 21, and 31 of respective networks and the vehicle managing ECU 41 shown in FIG. 1 are integrated into a single vehicle managing ECU 51.

Namely, according to the second embodiment, each of the communication lines L1, L2, and L3 of different functional networks is directly connected to only one vehicle managing ECU51. The vehicle managing ECU 51 performs the functions equivalent to those performed by the managing ECUs 11, 21, and 31 of respective networks and the vehicle managing ECU41 disclosed in the previously described first embodiment. The arrangement of vehicle managing ECU51, in hardware as well as in software, may be a combination of respective managing ECUs 11, 21, 31, and 41 shown in FIG. 1.

Figure 6:
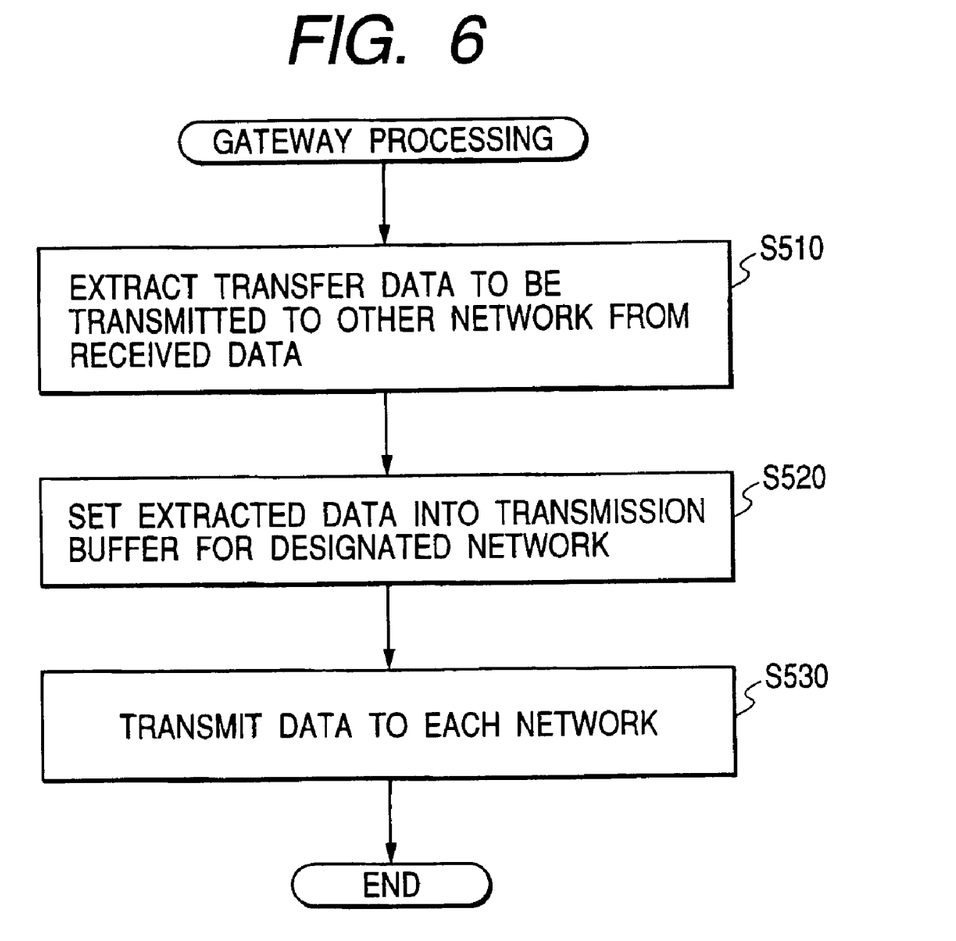
FIG. 6 is a flowchart showing gateway processing executed by a vehicle managing ECU in accordance with the second embodiment of the present invention.

Furthermore, the vehicle managing ECU 51 of the second embodiment functions as a gateway enabling the individual ECUs of different networks to exchange information. Namely, the vehicle managing ECU 51 executes the gateway processing shown in FIG. 6 at predetermined time intervals. After starting this gateway processing, in step S510, the vehicle managing ECU 51 receives data via communication lines L1, L2, and L3 from respective individual ECUs and extracts transfer data to be transmitted to other network (i.e., data of necessary information for other networks) from the received data. Next, in step S520, each data extracted in the step S510 is set in a transmission buffer for a designated network to which the extracted data is transmitted. Then, in step S530, the data of this transmission buffer is sent out to the communication line of a corresponding network. Regarding the relationship between each data and the network to which the data is transmitted is stored beforehand as a list in a ROM or another comparable nonvolatile memory.

As described above, the integrated vehicle control system in accordance with the second embodiment brings the effects identical with those of the integrated vehicle control system explained in the first embodiment. Furthermore, only one vehicle managing ECU 51 executes the abnormality detection processing based on the information obtained from respective networks. Thus, the abnormality detection executed by the vehicle managing ECU 51 covers wide-range and detail. Furthermore, the number of physical apparatuses or devices can be reduced.

As apparent from the foregoing description, the second embodiment of this invention provides an integrated vehicle control system including a plurality of networks (10, 20, 30) connecting a plurality of electronic control apparatuses via a plurality of communication lines (L1, L2, L3) to communicate with each other. Each network is provided for one or a plurality of functions of a vehicle. One electronic control apparatus connected to each of the plurality of communication lines (L1, L2, L3) of the plurality of networks (10, 20, 30) is a vehicle overall control apparatus (ECU 51) for transmitting operation directives to other electronic control apparatuses (ECUs 12–13, 22–25, 32–33), each functioning as an individual control apparatus of each network. The vehicle overall control apparatus (ECU 51) causes respective individual control apparatuses (ECUs 12–13, 22–25, 32–33) to operate according to the given operation directives, thereby realizing a collective control of the functions of each network. The vehicle overall control apparatus (ECU 51) determines the operation directives supplied to the individual control apparatuses (ECUs 12–13, 22–25, 32–33) based on information obtained via the communication lines (L1, L2, L3) from the individual control apparatuses (ECUs 12–13, 22–25, 32–33), and executes abnormality detection processing for detecting abnormality occurring in the integrated vehicle control system. Furthermore, the vehicle overall control apparatus (ECU 51) executes gateway processing by selecting information necessary for other network from information received via the communication lines (L1, L2, L3) and transmitting the selected information via a communication line of a corresponding network, thereby allowing mutual exchange of information between individual control apparatuses of different networks.

According to the integrated vehicle control system of the second embodiment, all of electronic control apparatuses need not operate independently or selfishly. One vehicle overall control apparatus (ECU 51), selected among these electronic control apparatuses, determines and transmits the operation directives to be supplied to each individual control apparatus (ECUs 12–13, 22–25, 32–33) of each network based on the information obtained via the communication lines from the individual control apparatuses (ECUs 12–13, 22–25, 32–33), thereby collectively control the functions of each network as well as functions of this control system. Furthermore, the vehicle overall control apparatus (ECU 51) executes the abnormality detection processing for detecting the abnormality occurring in this control system. Accordingly, this invention makes it possible to efficiently execute the abnormality detection ranging widely and covering the entire apparatuses of this control system, and also makes it possible to correctly identify the real root of the detected abnormality considering the overall conditions of this control system. Thus, the fail-safe processing can be executed appropriately.

The above-described first and second embodiments are mere samples of the present invention, and accordingly the present invention can be modified in various ways.

For example, it is possible to add a body equipment group network to the integrated vehicle control system shown in FIG. 1. In this case, the body equipment group network may include a door ECU for lock/unlock controlling doors, a power window open/close ECU for open/close controlling power windows, and a body equipment managing ECU for outputting the order (i.e., operation directives) to each individual ECU which are connected with each other via a communication line. The body equipment managing ECU transmits the door lock/unlock instructing order to the door ECU. The body equipment managing ECU transmits the power window open/close instructing order to the power window open/close ECU. Furthermore, the body equipment managing ECU executes the abnormality detection processing based on the information obtained from respective individual ECUs. According to this embodiment, one functional network can perform both door lock/unlock and power window open/close functions. It is also possible, even in this embodiment, to integrate the function of the body equipment managing ECU into the function of the vehicle managing ECU.

Furthermore, the classification of the functional groups is not limited to the above-described power train group, the vehicle motion group, and the power source group, and accordingly it is possible to use another functionalized groups. However, for recent advanced automotive vehicles, the power train group and the vehicle behavior group are the groups including most complicated and important control objective devices. Controlling the functions of these complicated and important control objective devices by the conventional control system will result in increase of data amount to be processed or exchanged and will require speedy communications. In this respect, the above-described embodiments of the present invention can separately provide the network 10 controlling the power train and the network 20 controlling the vehicle behavior so as to reduce the overall communication data amount.

Furthermore, it is not always necessary to provide a plurality of networks in a case that only one network can realize all of the required functions.

What is claimed is:

1. An integrated vehicle control system comprising a plurality of electronic control apparatuses connected via at least one communication line in a first network to communicate with each other for controlling specific functions of a vehicle, wherein one of said plurality of electronic control apparatuses functions as an overall control apparatus for transmitting operation directives to the other electronic control apparatuses, each functioning as an individual control apparatus, to cause respective individual control apparatuses to operate according to said operation directives, thereby realizing a collective control of said specific functions, said overall control apparatus determines said operation directives supplied to said individual control apparatuses based on information obtained via said communication line from said individual control apparatuses, and executes abnormality detection processing for detecting an abnormality occurring in the integrated vehicle control system, and said overall control apparatus executes gateway processing to select information necessary for a second network from information received via said communication line and to transmit the selected information via a host network to an overall control apparatus of the second network, thereby allowing mutual exchange of information between individual control apparatuses of differently functionalized networks.

2. The integrated vehicle control system in accordance with claim 1, wherein said overall control apparatus obtains condition data from said individual control apparatuses, said condition data representing operating conditions of control objective devices controlled based on said operation directives by said individual control apparatuses, and said overall control apparatus executes said abnormality detection processing by detecting the abnormality based on said obtained condition data and identifying an abnormal portion.

3. The integrated vehicle control system in accordance with claim 1, wherein said first network and said second network are different ones of a power train network, a vehicle motion network and a power source network.

4. The integrated vehicle control system in accordance with claim 1, wherein said overall control apparatus arbitrates requests received from the first network and the second network.

5. The integrated vehicle control system in accordance with claim 1, wherein said other electronic control apparatuses each controls a respective corresponding objective device to attain the operation directives.

6. The integrated vehicle control system in accordance with claim 1, wherein the overall control apparatus of the second network determines the abnormality has occurred in one of the plurality of electronic control apparatuses in the second network.

7. The integrated vehicle control system in accordance with claim 1, wherein information representative of the abnormality if in the first network is stored in the overall control apparatus of the first network, and information representative of the abnormality if in the second network is stored in the overall control apparatus of the second network.

8. An integrated vehicle control system comprising a plurality of networks connecting a plurality of electronic control apparatuses via a plurality of communication lines to communicate with each other, each network being provided for one of a plurality of functions of a vehicle, wherein one electronic control apparatus connected to each of said plurality of communication lines of said plurality of networks is a vehicle overall control apparatus for transmitting operation directives to other electronic control apparatuses, each functioning as an individual control apparatus of said each network, to cause respective individual control apparatuses to operate according to said operation directives, thereby realizing a collective control of said functions of said each network, said vehicle overall control apparatus determines said operation directives supplied to said individual control apparatuses based on information obtained via said communication lines from said individual control apparatuses, and executes abnormality detection processing for detecting an abnormality occurring in the integrated vehicle control system, and said vehicle overall control apparatus executes gateway processing by selecting information necessary for other network from information received via said communication lines and transmitting the selected information via a communication line of a corresponding network, thereby allowing mutual exchange of information between individual control apparatuses of different networks.

9. The integrated vehicle control system in accordance with claim 8, wherein said vehicle overall control apparatus obtains condition data from said individual control apparatuses, said condition data representing operating conditions of control objective devices controlled based on said operation directives by said individual control apparatuses, and said vehicle overall control apparatus executes said abnormality detection processing by detecting the abnormality based on said obtained condition data and identifying an abnormal portion.

10. The integrated vehicle control system in accordance with claim 8, wherein each network of said plurality of networks are different ones of a power train network, a vehicle motion network and a power source network.

11. The integrated vehicle control system in accordance with claim 8, wherein said vehicle overall control apparatus arbitrates requests received from the plurality of networks.

12. The integrated vehicle control system in accordance with claim 8, wherein said other electronic control apparatuses each controls a respective corresponding objective device to attain the operation directives.

13. The integrated vehicle control system in accordance with claim 8, wherein infonnation representative of the abnormality is stored in the vehicle overall control apparatus.

* * * * *